(12) United States Patent
Foxell et al.

(10) Patent No.: US 11,036,802 B2
(45) Date of Patent: Jun. 15, 2021

(54) CLASSIFICATION RULES ENGINE AND API GENERATOR

(71) Applicant: MORGAN STANLEY SERVICES GROUP INC., New York, NY (US)

(72) Inventors: Max Foxell, London (GB); Pete Brooks, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/532,012

(22) Filed: Aug. 5, 2019

(65) Prior Publication Data

US 2021/0042365 A1 Feb. 11, 2021

(51) Int. Cl.
| | |
|---|---|
| *G06F 3/14* | (2006.01) |
| *G06F 16/9032* | (2019.01) |
| *G06F 16/903* | (2019.01) |
| *G06F 16/906* | (2019.01) |
| *G06F 9/54* | (2006.01) |

(52) U.S. Cl.
CPC .......... *G06F 16/90328* (2019.01); *G06F 9/54* (2013.01); *G06F 16/906* (2019.01); *G06F 16/90335* (2019.01)

(58) Field of Classification Search
CPC ........................................................ G06F 3/14
USPC ................ 715/700; 705/26.62; 707/756, 769
See application file for complete search history.

(56) References Cited

U.S. PATENT DOCUMENTS

| | | | |
|---|---|---|---|
| 5,542,024 A | 7/1996 | Balint et al. | |
| 9,390,240 B1 * | 7/2016 | Brisebois | ................ G06F 21/31 |
| 2005/0172033 A1 | 8/2005 | Mathew et al. | |
| 2006/0095419 A1 | 5/2006 | Anderson | |
| 2008/0235174 A1 | 9/2008 | Scriffignano et al. | |
| 2009/0055343 A1 | 2/2009 | van Lunteren | |
| 2009/0077378 A1 | 3/2009 | Hacigumus et al. | |
| 2009/0106238 A1 | 4/2009 | Lita et al. | |
| 2012/0102062 A1 * | 4/2012 | Gurnani | ............ G06Q 30/0601 707/769 |
| 2012/0324569 A1 | 12/2012 | Diehl et al. | |
| 2013/0204880 A1 | 8/2013 | Lesiecki et al. | |
| 2013/0204886 A1 * | 8/2013 | Faith | ..................... G06Q 30/06 707/756 |

(Continued)

FOREIGN PATENT DOCUMENTS

KR 1020170136964 A 12/2017

*Primary Examiner* — Ruay Ho
(74) *Attorney, Agent, or Firm* — Weitzman Law Offices, LLC

(57) ABSTRACT

A system is disclosed, comprising data storage and one or more computing devices. The data storage stores a plurality of records, each record comprising a plurality of values, each value being associated with an attribute from a plurality of attributes, and each record representing a classification rule that is satisfied if and only if each value of the plurality of values is matched by a value in a candidate query. The computing devices comprise one or more processors and non-transitory memory storing instructions that, when executed by the one or more processors, cause processors to: provide a graphical user interface (GUI) to enable setting a first ordering of the plurality of attributes, receive a candidate query; and based on the ordering of the plurality of attributes, automatically determine and output a best match among a set of all classification rules that are satisfied by the candidate query.

12 Claims, 7 Drawing Sheets

(56) References Cited

U.S. PATENT DOCUMENTS

| | | | |
|---|---|---|---|
| 2014/0074826 A1 | 3/2014 | Cooper et al. | |
| 2014/0337175 A1* | 11/2014 | Katzin | G06Q 20/367 |
| | | | 705/26.62 |
| 2015/0025873 A1 | 1/2015 | Khan et al. | |
| 2016/0098654 A1 | 4/2016 | Bhattacharjee et al. | |
| 2018/0182049 A1* | 6/2018 | Oberle | G06F 16/20 |
| 2018/0307857 A1* | 10/2018 | Beecham | G06F 16/9024 |
| 2020/0073989 A1* | 3/2020 | Valentin | G06F 16/248 |
| 2020/0279041 A1* | 9/2020 | Endler | G06F 21/552 |
| 2020/0279050 A1* | 9/2020 | Endler | G06F 9/542 |

* cited by examiner

| leftLaneOccluded | rightLaneOccluded | country | slowerTrafficAhead | solidYellowLines | outcome |
|---|---|---|---|---|---|
| yes | no | * | * | * | right |
| no | yes | * | * | * | left |
| yes | yes | * | * | * | Slow/stop |
| no | no | United States | no | * | right |
| no | no | CommonwealthCountries | no | * | left |
| no | no | Canada | no | * | right |
| * | * | * | * | * | Slow/stop |

CommonwealthCountries
- United Kingdom
- India
- Bangladesh
- Canada
- Australia
- New Zealand

| DriverName | Label | Description | Validation |
|---|---|---|---|
| leftLaneOccluded | Left Lane Occluded? | Is the leftmost of two lines occluded? | (yes\|no\|unknown) |
| rightLaneOccluded | Right Lane Occluded? | Is the rightmost of two lines occluded? | (yes\|no\|unknown) |
| country | Country | Nation in which vehicle is driving | [A-Za-z]+ |
| slowerTrafficAhead | Traffic? | Whether a sensor detects traffic ahead in same lane | (yes\|no\|unknown) |
| solidYellowLines | Solid Yellows? | Whether sensor detects solid yellow paint on road | (yes\|no\|unknown) |

*Fig. 2*

CLASSIFICATION RULES ENGINE AND API GENERATOR

FIELD OF INVENTION

This application relates to software for providing an automatically updating application programming interface to other software programs, and more specifically, a system for classifying data sets against prioritized criteria to automatically determine a classification of an input without human intervention.

BACKGROUND

In the field of database table design and query design, it is often the case that a query may be structured to iterate over all entries in a database to find the best match to a query, where "best" is defined by a complex ranking of factors. For example, when a person who cannot remember the author of a book but remembers other information about the book, they might query an electronic library catalog for a book with a given title, published in a certain year, and in a certain genre. In returning possible search matches, a designer of the search system will likely prioritize matches in genre over matches in year, and matches in title over matches in genre, due to specificity and relevance concerns.

Problems in other domains, such as classification of an unknown input into a category, may have queries that effectively reverse the situation, having a single query about which all information is known, and which must be matched to one of a set of possible categories, based on a set of criteria of different priorities. For example, when a given payroll entry must be processed to determine wages paid as either regular or overtime, whether the employee is salaried may take precedence over what day of the year the work occurred on, which may take precedence over the number of hours worked.

Actually implementing code to prioritize these results may require complex chains of if-then-else statements, case switching statements, or other programming constructs to consider every possible combination of information present and determine the proper match or classification of a query. Implementation of complicated branching logical paths is particularly prone to programmer error as a possible input either "falls through" the logic without satisfying any condition, or is diverted along an incorrect path because the programmer did not consider all possible combinations or orderings of testing statements.

As a result, there is a need for automated software solutions to facilitate automatic generation of code to handle query or classification techniques.

SUMMARY OF THE INVENTION

A system is disclosed, comprising data storage and one or more computing devices. The data storage stores a plurality of records, each record comprising a plurality of values, each value being associated with an attribute from a plurality of attributes, and each record representing a classification rule that is satisfied if and only if each value of the plurality of values is matched by a value in a candidate query. The one or more computing devices comprise one or more processors and non-transitory memory storing instructions that, when executed by the one or more processors, cause the one or more processors to: provide a graphical user interface (GUI) to enable setting a first ordering of the plurality of attributes, receive a candidate query; and based on the ordering of the plurality of attributes, automatically determine and output a best match among a set of all classification rules that are satisfied by the candidate query.

A computer-implemented method for providing an interface to prioritize classification rules for an unclassified input, comprising retrieving, from a data storage, a plurality of records. Each record comprises a plurality of values, each value being associated with an attribute from a plurality of attributes, and each record representing a classification rule that is satisfied if and only if each value of the plurality of values is matched by a value in a candidate query. The method also comprises providing a GUI to enable setting a first ordering of the plurality of attributes; receiving a candidate query; and based on the ordering of the plurality of attributes, automatically determining and output a best match among a set of all classification rules that are satisfied by the candidate query.

BRIEF DESCRIPTION OF THE DRAWINGS

FIG. 2 depicts an example table of a ruleset stored by the system of FIG. 1;

DETAILED DESCRIPTION

In response to the difficulties of custom programming a classifier for every possible use case, a system may allow one or more users, even without programming knowledge, to determine what data attributes may be relevant to a classification of an input in a particular problem domain, what combinations of values for those attributes should receive those classifications, and which attributes should be prioritized over others when multiple rules of different specificities are matched by an unclassified input.

Figure 1:
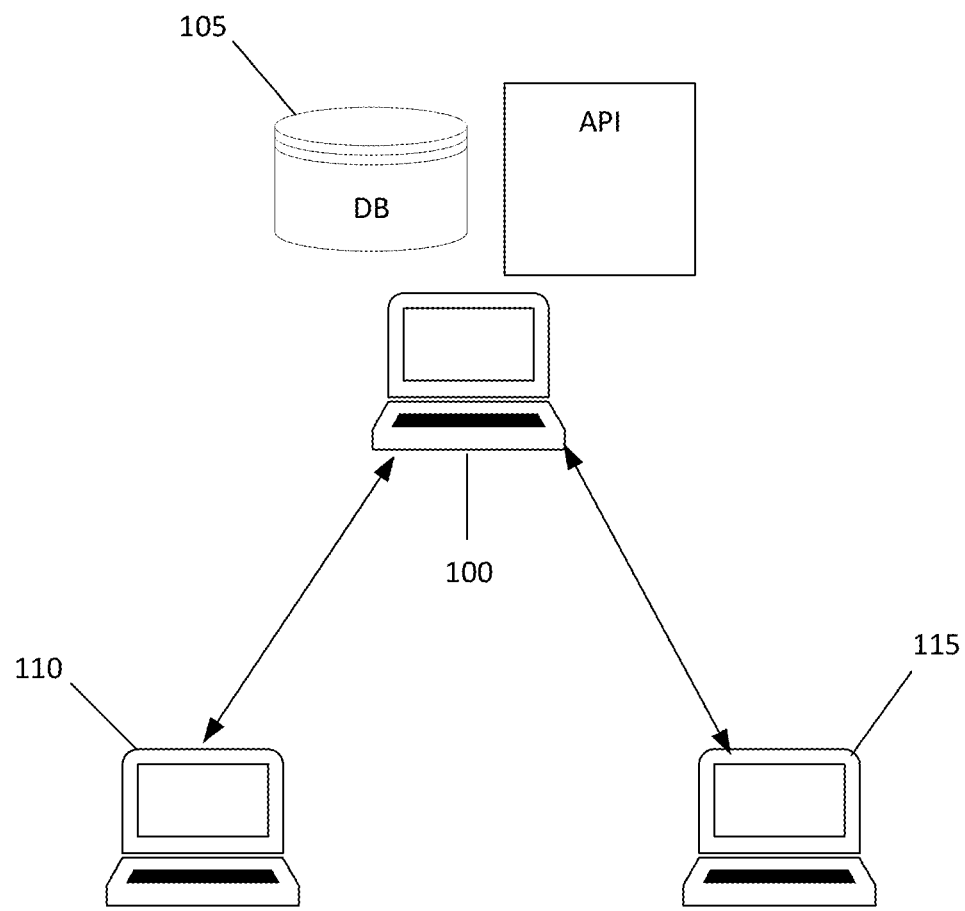
FIG. 1 depicts a system for storing classification criteria and providing application programming interfaces (APIs) for classification to downstream software applications according to methods disclosed herein.

FIG. 1 depicts a basic system for storing classification criteria and providing APIs for classification to downstream software applications according to methods disclosed herein.

A central computing device 100 (such as a production server in a software development backend) may have a number of software modules and data stores used to store and process the data that represents a number of classification rules. In some embodiments, all such modules and data storage may be present in a single computing device, while in others, the modules and storage may be distributed, such that one or more database servers store tables of data, a first remote device queries them to receive data and processes the data, a second remote device (such as a build server)

receives the processed data to generate code libraries, which are further downloaded and stored on other devices, etc.

A database 105 stores a number of rules, organized into rulesets, as illustrated in FIG. 2, below, and discussed there further. Database 105 (or another database) may also store user credentials and permissions to be checked in determining whether a user has the right to modify or view any rules, and under what circumstances.

An API generation module (described further below, regarding FIG. 5) may use the stored classification rules to create a software module geared towards use by a software application to classify unknown inputs. In some embodiments, this API may include in whole or in part a SQL (structured query language) stored procedure that can be loaded into a database process an input to output a classification, a Java JAR file that provides a class one or more functions for input classification, a dynamic linked library (DLL) for access by a software application running in a given operating system, a server-side script that receives input via an HTTP request and outputs a classification in a given format, or any other form of code, in any language, running locally or remotely but callable through a predetermined protocol or format by a piece of software. If the generated API is a server-side solution, it may stay in central computing device 100 or another server computing device such as a client-facing webserver or mainframe, whereas if it is a local solution, it may be provided to a download server that will allow other computers to download the API, or even pushed via a software update to any number of machines that have subscribed to the system for software updates or are part of an organization operating the system.

User computer 110 may be used by a rule developer to contact central computing device 100 and use an interface (such as a GUI if central computing device 100 has webserver capabilities) to edit rules stored in database 105.

End user computer 115 may be used to download a compiled API from central computing device 100 or to transmit data to an API hosted by central computing device 100 in order to receive classifications of unclassified data input.

FIG. 2 depicts an example table of a ruleset stored by the system of FIG. 1.

A data storage and classification system may comprise one or more tabular data structures 200 for a "ruleset," each comprising a number of records 205 for each classification rule stored within the system.

A ruleset is associated with a plurality of "drivers" 210, or attributes that an input may have associated with it and that may be relevant in applying a classification to an input in a given problem domain. A number of rules may be created within the ruleset, each rule defining values for each of the drivers associated with the ruleset, as well as a classification that may be appropriate for an input if the input's driver values match each of the values of a rule. The ordering of the drivers is used to indicate their priority, such that a match at a higher priority driver is more important than a match at a lower priority driver.

Drivers may be assigned a value that is a specific value, a group driver, or a wildcard.

If a driver value is a specific value, then an unclassified input must have that value as well to satisfy the rule. For example, if an artificial intelligence subsystem of an autonomous vehicle needs to decide whether to drive on the left or the right side of the road, a "driver" representing the current country may be present in the system, and one rule may generally classify any input with "United States" with the response to drive on the right, and another generally classify input with "United Kingdom" with the response to drive on the left.

A group driver 215 may be defined that represents a number of specific values, to act as a shortcut and replace a number of rules that are identical except for a change in one specific value. In the autonomous vehicle example, instead of creating a rule for every single nation that drives on the left, a group (such as "CommonwealthNations") might be created in memory and associated with each of a set of nations.

A wildcard may be denoted with an asterisk or other symbol and indicates that a given driver is irrelevant to the classification so long as other drivers match.

Each driver may have a validation requirement 220, such as a datatype (such as an integer, decimal, string), a mandatory selection from a predetermined set of options, or a regular expression to which any valid value other than a wildcard or group driver must match.

Drivers may also be assigned a programmatic description 225, a display label 230, and/or a user description 235 that may be used as documentation and for usability in an interface for driver editing. A backend user editing a ruleset and defining rules may be exposed primarily to the display labels and user descriptions, while an end user using an application to feed data into an API for classification may be expected to use only the programmatic description in formatting and sending the data to the API, and only see the display label or user description when consulting written documentation that the system (or a backend user) generates.

Finally, each rule has an outcome or classification 240, representing the output of the classification system if that rule is the best match for a given input. In the example of FIG. 2, an autonomous vehicle may be directed either to drive on the left, drive on the right, or slow down and/or stop entirely, based on the road conditions at each moment in time.

A rule may also store a date range during which the rule is effective. For example, if a new traffic law is going to go into effect on January 1 of the new year and redirect traffic to the other side of the road, a first rule may be created that governs the time range up to December 31 and classifies an input in one way, while a second rule may have identical driver values, govern a time range starting on January 1, and classify the same input in a different way.

In some embodiments, version controls may be used to retain every rule that ever existed within the system, in the exact format it existed at the time. In those embodiments, or in others where the information may be useful, each rule may store additional data, such as a creation date, creating user, unique ID, and/or a flag indicating whether a rule is active, or has instead been modified and a more recent form of the rule exists.

The presently described system is completely agnostic to the type of data it stores and classifies; it does not change basic functionality whether the classifications being performed are fundamentally scientific, technical, financial, or legal in nature. Any aspects of the system that are directed to social, financial, or legal problems must be accomplished through the user defined rules and validation checks, not through the system itself actually fundamentally encoding a financial or legal logical system.

Figure 3:
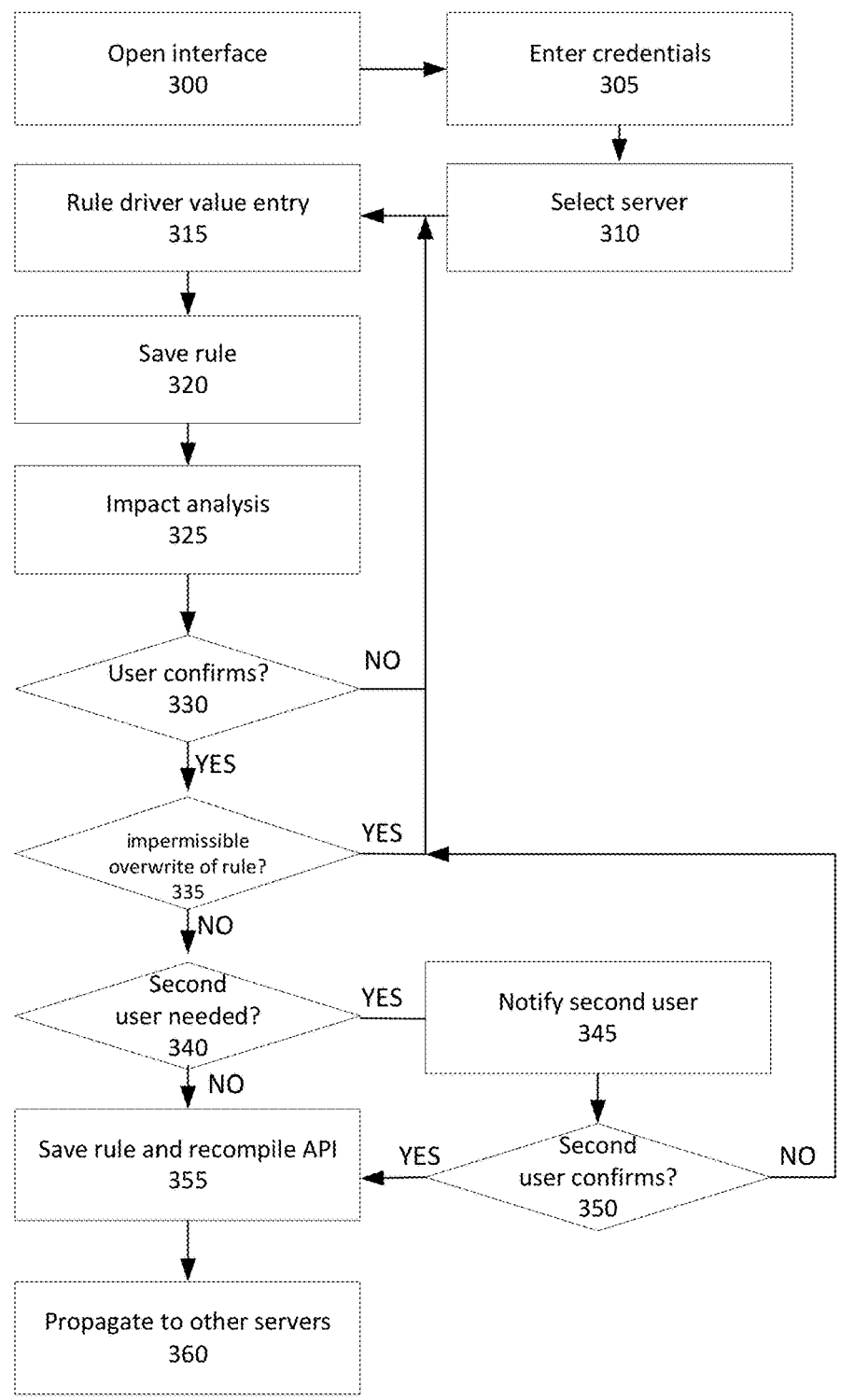
FIG. 3 depicts, in simplified form, a method of entering a new rule into a ruleset.

FIG. 3 depicts, in simplified form, a method of entering a new rule into a ruleset.

Initially, a backend user opens an interface for rule editing or creation (Step 300). This can be, for example, a GUI on a webpage, a GUI in a dedicated data management program, or even a program that uses an API to upload and enter rules into the system.

The user may be prompted to enter credentials, such as a username and password (Step 305). Based on a user's credentials, the user may be restricted in terms of which servers can be accessed, which rulesets can be modified, and whether the user needs a supervisor to approve a new or modified rule before it is committed permanently.

Figure 6:
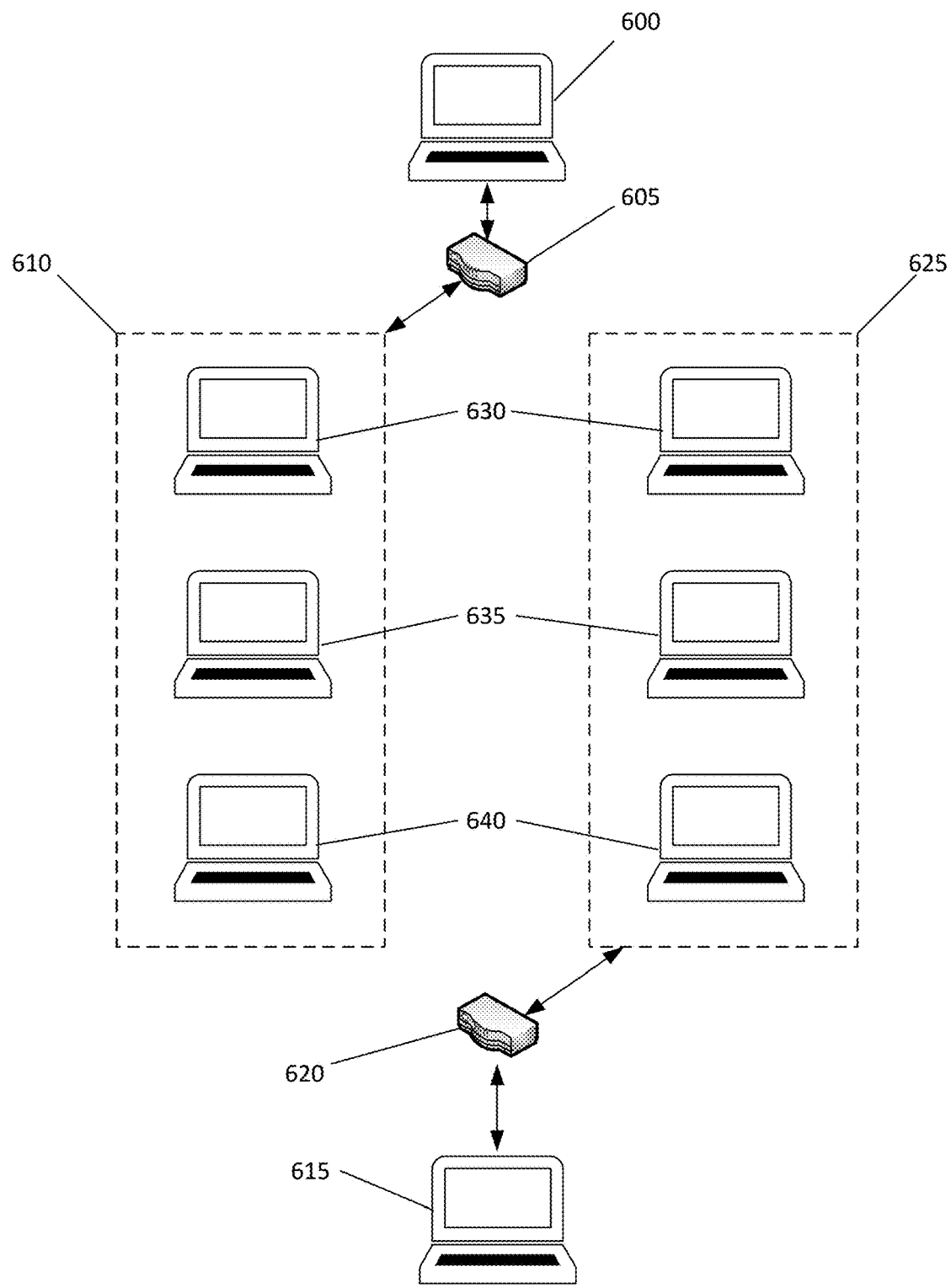
FIG. 6 depicts a possible variation of FIG. 1 as a blue-green deployment system including a production server and multiple servers for development and quality assurance testing.

Next, the user selects a server, if applicable. (Step 310). FIG. 6, discussed in greater detail below, depicts a more complex sample system with a variety of servers, including production servers, quality assurance servers, and development servers. Depending on whether the user is even permitted to access production servers, and whether the user urgently needs a rule to go into production or can test it in development or a testing server, the user may select a server from the available options, or be automatically directed to the only option for which the user has permission.

Next, the user selects a ruleset on the selected server, selects an interface option to begin creating a new rule within that ruleset, and then sets values for each driver in the rule (Step 315). As the user enters values, validation may occur upon each of the driver values, verifying against the validation requirement 220 for each driver.

When the user has entered driver values for the rule, the user may select an interface option to save the rule in the system's data storage (Step 320).

In some embodiments, the system may display an impact analysis of the addition of the rule at the time the user is ready to save the rule. Information displayed in the impact analysis may include, for example, whether the new rule overwrites an existing rule with identical driver values and a different outcome; the existence of any strictly broader rules it will begin to overrule due to its greater specificity; the existence of other partially overlapping rules that may render this rule unnecessary; or examples of actual data in a local database that would be reclassified if this rule went into effect, compared to the existing ruleset.

If the user is happy with the new rule (Step 325), the user confirms saving the rule into storage (Step 330).

If the new rule would conflict with and directly overwrite any existing rule and some form of protection prevents an override (Step 335), then the attempted rule save is prevented and the user may try to add a different new rule. Examples of protection may include that a rule has been temporarily locked for editing by another user, a flag on a particular rule that it should never be overwritten, a flag on a ruleset indicating that none of its rules should be overwritten, or a user being denied permission to overwrite existing rules on certain servers or in other contexts. The overwriting detection and impact analysis steps may also take into account the effective date ranges of a pair of otherwise identical rules, and determine that there is actually no conflict because the first rule will expire before the second rule goes into effect.

If the user is currently logged into a server with heightened protection, such as a production server (Step 340), then the rule is not immediately made active and instead a second user is notified of the existence of a pending rule (Step 345). If the second user confirms the rule is correct and proper (Step 350), then the rule is entered; otherwise it is not permanently stored and the user may have the opportunity to enter a different new rule.

If nothing has prevented enactment of a rule, the rule may be saved and the system may recompile any API depending on the rule (discussed in greater detail below, regarding FIG. 5) and begin offering that new API to other software for classification (Step 355).

In multi-server systems with production, testing, and development environments, the new rule may be propagated automatically down to lower servers (Step 360) (i.e., from production to testing and from testing to development). If the rule cannot be propagated because the version of the ruleset on the lower server has different drivers or other incompatibilities, the system may automatically address the issue by editing the ruleset, or generating a notice that a rule has failed to propagate so that a human user can take appropriate actions to recover.

Other options in the rule editing user interface may include, for example, reordering the drivers in a ruleset, deleting an existing rule, restoring a previously deleted rule, modifying an existing rule, adding new drivers to a ruleset, removing drivers from a ruleset, creating drivers to be stored in the system and accessed by other rulesets, editing attributes of drivers such as descriptions or validation requirements. There may be further limits or sanity checks on these actions; for example, not permitting deletion of a driver while rulesets are still relying on it, and not permitting deletion of a ruleset while it still contains rules.

Figure 4:
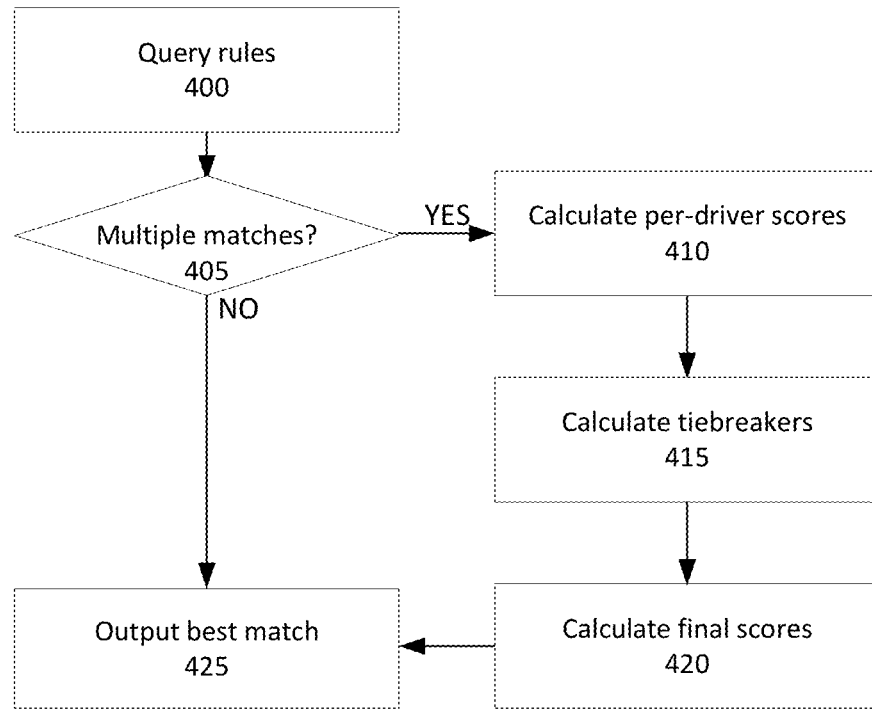
FIG. 4 depicts, in simplified form, a method of determining a best match to a classification rule for a given data input.

FIG. 4 depicts, in simplified form, a method of determining a best match to a classification rule for a given data input.

Initially, the API may query its stored list of rules to find all matching rules to the data input (Step 400). The query may, in a preferred embodiment, take the form of an intersection of a number of Boolean checks to confirm that, for every driver in the input data, the input's value matches the rule driver value, or the rule driver value is a wildcard. For example, for a data input of an autonomous vehicle driving in the U.S. with no obstacles or traffic, rules in an SQL database might be retrieved via "SELECT * FROM rules WHERE (country='United States' OR country='*') AND (leftLaneOccluded='no' OR leftLaneOccluded='*') AND (rightLaneOccluded='no' OR rightLaneOccluded='*') AND . . . ."

If group drivers are in use, the Boolean expressions in the query may need to include further every group driver that the data input's values are found in; for example, "(country='United Kingdom' OR country='CommonwealthCountries' OR country='*')".

If only one rule matches and responds to the query (Step 405), the classification is necessarily complete. Otherwise, each matching rule will be scored.

In a preferred embodiment, scoring proceeds by determining per-driver scores for each match (Step 410), including any tie-breaker aspects necessitated by the use of less-specific matching constructs such as group drivers (Step 415), before adding the per-driver scores up to produce a final score (Step 420).

In a preferred embodiment, a strict ordering of all possible rule matches may be maintained by awarding $n^{(t-p)}$ points to each attribute match that is not merely a wildcard match, where n is a predetermined integer equal to 2 or more, t is the total number of drivers, and p is the priority of the driver within the ordering specified in the ruleset (1 for the first driver, 2 for the second driver, and so on). With this specific scoring function, the score given for a rule with a direct match at a higher priority is mathematically guaranteed to be higher than the score given to a rule that only matches at a lower priority driver, even if it has a greater number of matching drivers.

In systems using group drivers or other less specific matching language features, the scoring of a given matching attribute may be set to $n^{(t-p)}+b$, where b is a bonus value for the specificity of a match: for example, matching on a group driver may have a bonus of zero, while matching with a specific value may have a value of 0.1. As long as the bonus value is a sufficiently small number, the strict ordering of rule matches may still be preserved based both on priority of the drivers in the rule and the specificity of the drivers as a tiebreaker.

Once the final scores of all matching rules are known (or only one rule matched), the API outputs the best match out of all matching rules (Step 425).

The following paragraphs describe some examples of rule matching using the ruleset illustrated in FIG. 2 and the preferred scoring function described in the discussion of FIG. 4.

When given the input of [no, no, United States, no, yes], all rules except the fourth and seventh are disqualified because of a mismatch with at least one of the input driver values. For the fourth rule, the specific match on "leftLaneOccluded" scores 16.1 points ($2^{(5-1)}+0.1$, where there are five drivers and this is the first, and there is a specific match), and the matches on the next three drivers score 8.1, 4.1, and 2.1 points respectively ($2^{(5-2)}+0.1$, $2^{(5-3)}+0.1$, $2^{(5-4)}+0.1$). Matching a wildcard on the fifth driver nets no points. The fourth rule thus has a total score of 30.4. The seventh rule matches all drivers of the input, but because it is entirely made up of wildcards, it has a total score of 0. As a result, the classifier returns the output of "right" and the autonomous vehicle stays on the right side.

When given the input of [no, no, Canada, no, yes], all rules except the fifth, sixth, and seventh are disqualified because of a mismatch with at least one of the input driver values. As in the above example, the sixth rule will receive a total score of 30.4 from a specific match on the first four drivers. The fifth rule will only receive a total score of 30.3, because CommonwealthCountries, a group driver in the third driver position, is a match but does not receive a tie-breaking bonus. The seventh rule, as always, will receive a score of 0. As a result, the classifier selects the sixth rule over the fifth or seventh rules, capturing the intuition that while most former British colonies drive on the left, Canada is a specific counterexample to the rule where cars drive on the right.

When given the input of [no, no, France, no, yes], the only matching rule in this sample dataset is the seventh rule. As a result, even with a score of zero and only wildcard matches, this rule will be applied; it will never be the best match for any input except for those inputs which do not satisfy any other rule in the system.

Figure 5:
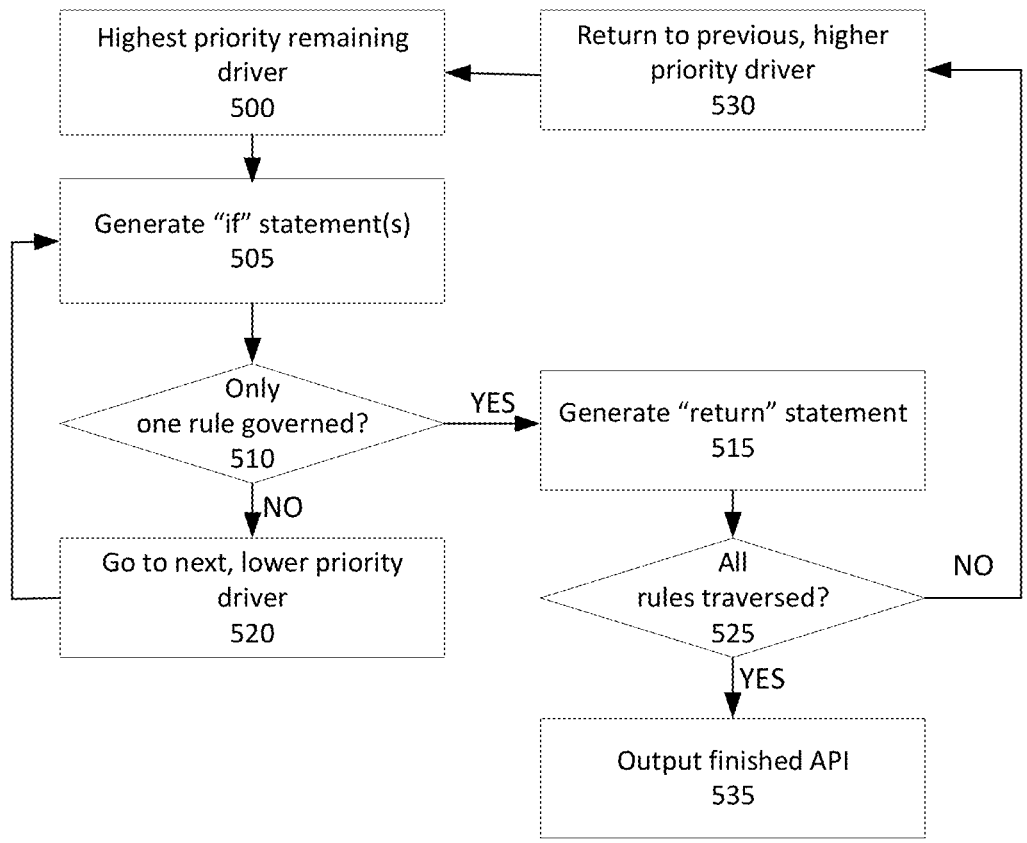
FIG. 5 depicts a method of converting a given ruleset to an equivalent tree structure compatible with any imperative programming language.

FIG. 5 depicts a method of converting a given ruleset to an equivalent tree structure compatible with any imperative programming language.

When the preferred scoring function in the discussion of FIG. 4 is used, its output can be directly approximated by an equivalent tree of if/then/else statements. Starting with the highest priority driver of those remaining (Step 500), an if statement can be generated (Step 505) for every specific value, and then every group driver, and then the wildcards for that driver value.

Recursively, every time an if statement is generated, a subtree may be generated for each rule that might still be selected based on the lower-priority drivers. If only one rule in the ruleset corresponds to that logical path (Step 510), a return statement may be generated (Step 515), and if the rules have not all been processed (Step 525), the recursion may pass one level back up (Step 530) to a branch from a higher priority driver. If multiple rules still need to be distinguished at any given point, the recursion persists, going to a lower priority driver (Step 520).

Once all rules have been processed (Step 525), the completed code for the API is published (Step 535). For example, an equivalent structure for the ruleset illustrated in FIG. 2 might be:

```
if (leftLaneOccluded == "yes") {
    if (rightLaneOccluded == "yes") {
        return "slow/stop"
    } else if (rightLaneOccluded == "no") {
        return "right"
    }
} else if (leftLaneOccluded == "no") {
    if (rightLaneOccluded == "yes") {
        return "left"
    } else if (rightLaneOccluded == "no") {
        if (country == "United States") {
            return "right"
        } else if (country == "Canada") {
            return "right"
        } else if (contains(CommonwealthCountries, country)) {
            return "right"
        }
    }
}
return "slow/stop"
```

This code may be included in a library to be efficiently and quickly run on a number of unclassified inputs without the need to repeatedly query a database of rules to see which rules are candidates and then repeatedly score them to determine a best scoring rule.

A generated API may also, in addition to the primary functionality of classifying inputs, provide additional functions, such as tracking statistics on the number of classification calls that have been made, with what inputs, and by which users; or providing automatic documentation or visualization tools for a user to traverse any logical trees or other data structures and see why a particular classification is returned for a particular input.

FIG. 6 depicts a possible variation of FIG. 1 as a blue-green deployment system including a production server and multiple servers for development and quality assurance testing.

An end user computer 600 may seek to access a production server for classification of input data or downloading an API for local use. When the end user computer attempted to contact a production server through end user router 605, the message is directed to the production server from the "blue" server cluster 610, where the live version of code intended for end user access is kept.

Meanwhile, developer computer 615 is forced by developer router 620 only to access "green" server cluster 625, which acts as a mirror of the blue cluster but may be modified freely without any end users being able to see changes or bugs in the software.

Each server cluster may have one or more production servers 630, one or more quality assurance or testing servers 635, and one or more development servers 640.

At any moment in time, if quality assurance testing concludes that the green server cluster 625 is ready to be used by the end users, both routes 605 and 620 may be redirected to switch their redirection schemes, so that end users are now sent to the formerly "green" cluster, which is now denoted as the new "blue" cluster, and developers likewise begin working on a new software version on the old "blue" cluster, which is the new "green" cluster.

In some embodiments, developers may be completely prevented at all times from making rule changes to the current blue server cluster, and constrained instead to using the green server cluster and waiting for the blue and green designations to be transposed. In other embodiments, changes to the blue cluster may be possible, but may be protected (as previously mentioned) by requiring two users to sign off on a change before it can enter the blue production system.

Figure 7:
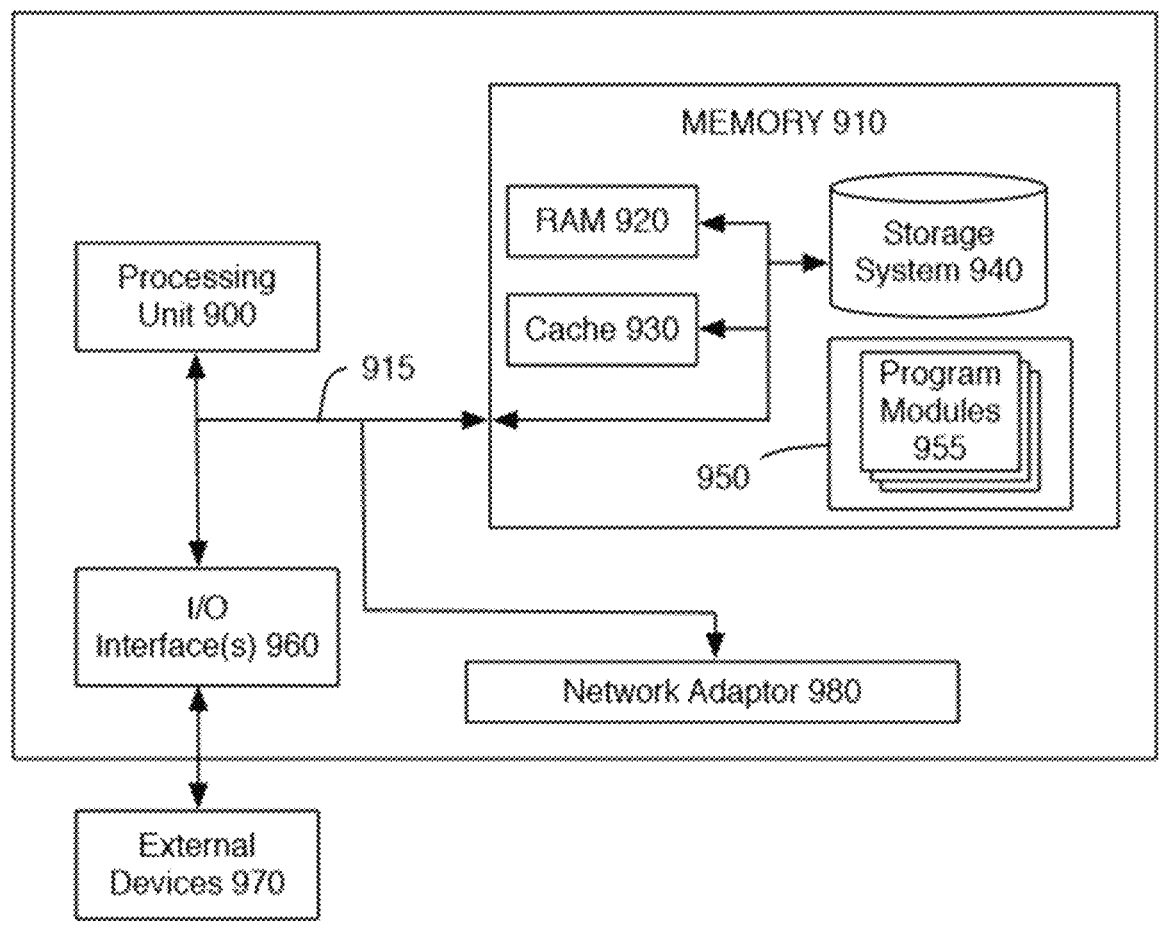
FIG. 7 is a high-level block diagram of a representative computing device that may be utilized to implement various features and processes described herein.

FIG. 7 is a high-level block diagram of a representative computing device that may be utilized to implement various features and processes described herein, including, for example, for executing software on any of the computing devices and servers described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with the other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system, comprising:
    data storage storing a plurality of records, each record comprising a plurality of values, each value being associated with an attribute from a plurality of attributes, each record representing a classification rule that is satisfied if and only if each value of the plurality of values is matched by a value in a candidate query, and wherein one or more of the values comprised by the records consists of a wildcard operator; and
    a first one or more computing devices comprising one or more processors and non-transitory memory storing instructions that, when executed by the one or more processors, cause the one or more processors to:
        provide a graphical user interface (GUI) to enable setting a first ordering of the plurality of attributes;
        receive a candidate query; and
        based on the ordering of the plurality of attributes, automatically determine and output a best match among a set of all classification rules that are satisfied by the candidate query, using a scoring function that comprises, for each matching attribute, starting with a base value that is the same for each attribute, raising the base value to a power (t-p) where there are t total attributes and the matching attribute is in pth position among all attributes in an ordering of the t total attributes, and adding the raised powers to obtain a final score for a classification rule.

2. The system of claim 1, wherein the instructions, when executed by the processor, further cause the processor to:

generate an application programming interface (API) that facilitates input of a candidate query and output of the best match in a software application that is not in communication with the first one or more computing devices between input of the candidate query and output of the best match.

3. The system of claim 1, wherein the scoring function generates a unique best match by guaranteeing that any possible match receives a different score from any other possible match.

4. The system of claim 1, wherein one or more of the values comprised by the records is a group datatype.

5. The system of claim 1, wherein the instructions, when executed by the processor, further cause the processor to:
   determine that a first user supplying an ordering of the plurality lacks a stored credential to unilaterally set the ordering of the plurality;
   receive, from a second user having the stored credential, approval of the ordering of the plurality; and
   responsive to the receiving of the approval, use the first ordering in the automatic determination and output of the best match.

6. The system of claim 1, further comprising a second one or more computing devices comprising one or more processors and non-transitory memory storing instructions that, when executed by the processor, cause those one or more processors to:
   provide a GUI to enable receiving a second ordering of a plurality of attributes, wherein the second ordering is different from the first ordering either because it orders a different plurality of attributes from the plurality of attributes of the first ordering, or because it re-orders a same plurality of attributes as the first ordering:
   receive a candidate query;
   based on the second ordering, automatically determine and output a best match among a set of all rules that are satisfied by the candidate query.

7. A computer-implemented method for providing an interface to prioritize classification rules for an unclassified input, comprising:
   retrieving, from a data storage, a plurality of records, each record comprising a plurality of values, each value being associated with an attribute from a plurality of attributes, each record representing a classification rule that is satisfied if and only if each value of the plurality of values is matched by a value in a candidate query, and wherein one or more of the values comprised by the records consists of a wildcard operator;
   providing a graphical user interface (GUI) to enable setting a first ordering of the plurality of attributes;
   receiving a candidate query; and
   based on the ordering of the plurality of attributes, automatically determining and outputting a best match among a set of all classification rules that are satisfied by the candidate query, using a scoring function that comprises, for each matching attribute, starting with a base value that is the same for each attribute, raising the base value to a power (t-p) where there are t total attributes and the matching attribute is in a pth position among all attributes in an ordering of the t total attributes, and adding the raised powers to obtain a final score for a classification rule.

8. The method of claim 7, further comprising:
   generating an API that facilitates input of a candidate query and output of the best match in a software application that, between input of the candidate query and output of the best match, is not in communication with one or more computing devices that generated the API.

9. The method of claim 7, wherein the scoring function generates a unique best match by guaranteeing that any possible match receives a different score from any other possible match.

10. The method of claim 7, wherein one or more of the values comprised by the records is a group datatype.

11. The method of claim 7, further comprising:
   determining that a first user supplying the first ordering lacks a stored credential to unilaterally set an ordering of the plurality;
   receiving, from a second user having the stored credential, approval of the first ordering; and
   responsive to the receiving of the approval, using the first ordering in the automatic determination and output of the best match.

12. The method of claim 7, further comprising:
   providing a GUI to enable receiving a second ordering of a plurality of attributes, wherein the second ordering is different from the first ordering either because it orders a different plurality of attributes from the plurality of attributes of the first ordering, or because it re-orders a same plurality of attributes;
   receiving a candidate query;
   based on the ordering of the second plurality of attributes, automatically determining and outputting a best match among a set of all rules that are satisfied by the candidate query.

* * * * *